(12) United States Patent
Hwang et al.

(10) Patent No.: US 9,182,539 B2
(45) Date of Patent: Nov. 10, 2015

(54) LIQUID CRYSTAL DISPLAY DEVICE AND METHOD OF MANUFACTURING THE SAME

(71) Applicants: Jeong-Ho Hwang, Yongin (KR); Jae-Rok Cha, Yongin (KR)

(72) Inventors: Jeong-Ho Hwang, Yongin (KR); Jae-Rok Cha, Yongin (KR)

(73) Assignee: SAMSUNG DISPLAY CO., LTD., Yongin, Gyunggi-Do (KR)

( * ) Notice: Subject to any disclaimer, the term of this patent is extended or adjusted under 35 U.S.C. 154(b) by 39 days.

(21) Appl. No.: 13/709,328

(22) Filed: Dec. 10, 2012

(65) Prior Publication Data
US 2014/0043558 A1   Feb. 13, 2014

(30) Foreign Application Priority Data
Aug. 8, 2012   (KR) .................. 10-2012-0086935

(51) Int. Cl.
*G02F 1/1333*   (2006.01)
*F21V 8/00*   (2006.01)

(52) U.S. Cl.
CPC ............ *G02B 6/0095* (2013.01); *G02B 6/0056* (2013.01); *G02B 6/0088* (2013.01); *G02F 2001/133317* (2013.01); *G02F 2202/28* (2013.01)

(58) Field of Classification Search
None
See application file for complete search history.

(56) References Cited

U.S. PATENT DOCUMENTS

| | | | |
|---|---|---|---|
| 6,016,175 A * | 1/2000 | Kim | 349/58 |
| 2005/0099790 A1 * | 5/2005 | Kang et al. | 362/31 |
| 2007/0222917 A1 * | 9/2007 | Ono | 349/65 |
| 2011/0187956 A1 | 8/2011 | Kim et al. | |
| 2012/0169961 A1 * | 7/2012 | Ha et al. | 349/61 |
| 2012/0182493 A1 * | 7/2012 | Hwang et al. | 349/58 |

FOREIGN PATENT DOCUMENTS

| KR | 10-1999-0008719 A | 2/1999 |
|---|---|---|
| KR | 10-2006-0001237 A | 1/2006 |
| KR | 10-2006-0083029 A | 7/2006 |
| KR | 10-2009-0122746 A | 12/2009 |
| KR | 10-2011-0090029 A | 8/2011 |

\* cited by examiner

*Primary Examiner* — Richard Kim
(74) *Attorney, Agent, or Firm* — Lee & Morse, P.C.

(57) ABSTRACT

A liquid crystal display device includes a liquid crystal panel, a backlight unit that faces the liquid crystal panel and that includes a light source, a light guide plate, and an optical sheet unit, a mold frame that encloses the backlight unit and that includes a main body part and a protrusion, which protrusion is disposed between the liquid crystal panel and the backlight unit and protrudes from the main body part in a lateral direction, and an adhesive member that bonds the mold frame to the liquid crystal panel.

19 Claims, 4 Drawing Sheets

LIQUID CRYSTAL DISPLAY DEVICE AND METHOD OF MANUFACTURING THE SAME

CROSS-REFERENCE TO RELATED PATENT APPLICATION

This application claims priority under 35 U.S.C. §119 to Korean Patent Application No. 10-2012-0086935, filed on Aug. 8, 2012, in the Korean Intellectual Property Office, the disclosure of which is incorporated herein in its entirety by reference.

BACKGROUND

Display devices for displaying an image are used in electronic devices, such as portable communication terminals, digital cameras, notebook computers, TVs, and the like. As a display device, a flat panel display device, which is thin and lightweight, has recently been widely used.

Flat panel display devices include various devices, such as liquid crystal display devices, organic light-emitting display devices, and plasma display devices. Among these flat panel display devices, liquid crystal display devices have been widely used in various applications due to their advantages of being light weight, having a thin profile, and enabling operation with low power consumption.

SUMMARY

Embodiments may be realized by providing a liquid crystal display device that includes a liquid crystal panel, a backlight unit that is configured to face the liquid crystal panel, which backlight unit includes a light source, a light guide plate, and an optical sheet unit, a mold frame that is configured to surround the backlight unit, which mold frame includes a main body part and a protrusion that is disposed between the liquid crystal panel and the backlight unit and protrudes from the main body part in a lateral direction, and an adhesive member that bonds the mold frame to the liquid crystal panel.

The adhesive member may include a thermoplastic resin. The adhesive member may include a hot melt. The mold frame may include a side surface that is opposite to a surface of the mold frame facing the backlight unit. An extension line of the side surface of the mold frame may not be formed beyond a side surface of the liquid crystal panel. A bottom surface of the protrusion may contact an optical sheet of the backlight unit.

The liquid crystal display device may further include a polarizing member between the liquid crystal panel and the backlight unit. A top surface of the mold frame may contact a bottom surface of the polarizing member. The top surface of the mold frame may be formed smooth.

The liquid crystal display device may further include a polarizing member between the liquid crystal panel and the backlight unit. The adhesive member may be configured to correspond to a space formed between the liquid crystal panel and the mold frame by the polarizing member.

The adhesive member may be configured to contact side surfaces of the liquid crystal panel and the mold frame which are adjacent to the space formed between the liquid crystal panel and the mold frame that is spaced apart from the polarizing member.

The mold frame may further include a blocking part that protrudes from a top surface of the mold frame facing the liquid crystal panel towards the liquid crystal panel. The blocking part may contact the liquid crystal panel. The blocking part may be formed spaced apart from the side surface of the mold frame.

The liquid crystal display device may further include a space formed between the blocking part and the side surfaces of the mold frame and the liquid crystal panel, and the adhesive member may be disposed in the space. A side surface of the blocking part may coincide with a side surface of the mold frame.

The liquid crystal display device may further include a reflective sheet configured so as to face a surface that is opposite to a surface of the light guide plate of the backlight unit which faces the liquid crystal panel.

The liquid crystal display device may further include a chassis formed so as to correspond to a bottom surface of the backlight unit and bottom and side surfaces of the mold frame. The chassis may include a bottom part that is configured to correspond to the bottom surface of the mold frame and the backlight unit, and a side surface part that extends from the bottom part and contacts the side surface of the mold frame.

Embodiments may also be realized by providing a method of manufacturing the liquid crystal display device, the method including preparing a liquid crystal panel; disposing a backlight unit so as to face the liquid crystal panel, wherein the backlight unit includes a light source, a light guide plate, and an optical sheet unit; disposing a mold frame that includes a main body part configured to surround the backlight unit and a protrusion that is formed between the liquid crystal panel and the backlight unit and protrudes from the main body part; and bonding the mold frame to the liquid crystal panel by using an adhesive member.

The bonding may include using the adhesive member formed by melting and cooling a material including a thermoplastic resin. The adhesive member may include a hot melt.

BRIEF DESCRIPTION OF THE DRAWINGS

Features will become more apparent to those of ordinary skill in the art by describing in detail exemplary embodiments thereof with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of exemplary implementations to those skilled in the art.

Figure 1:
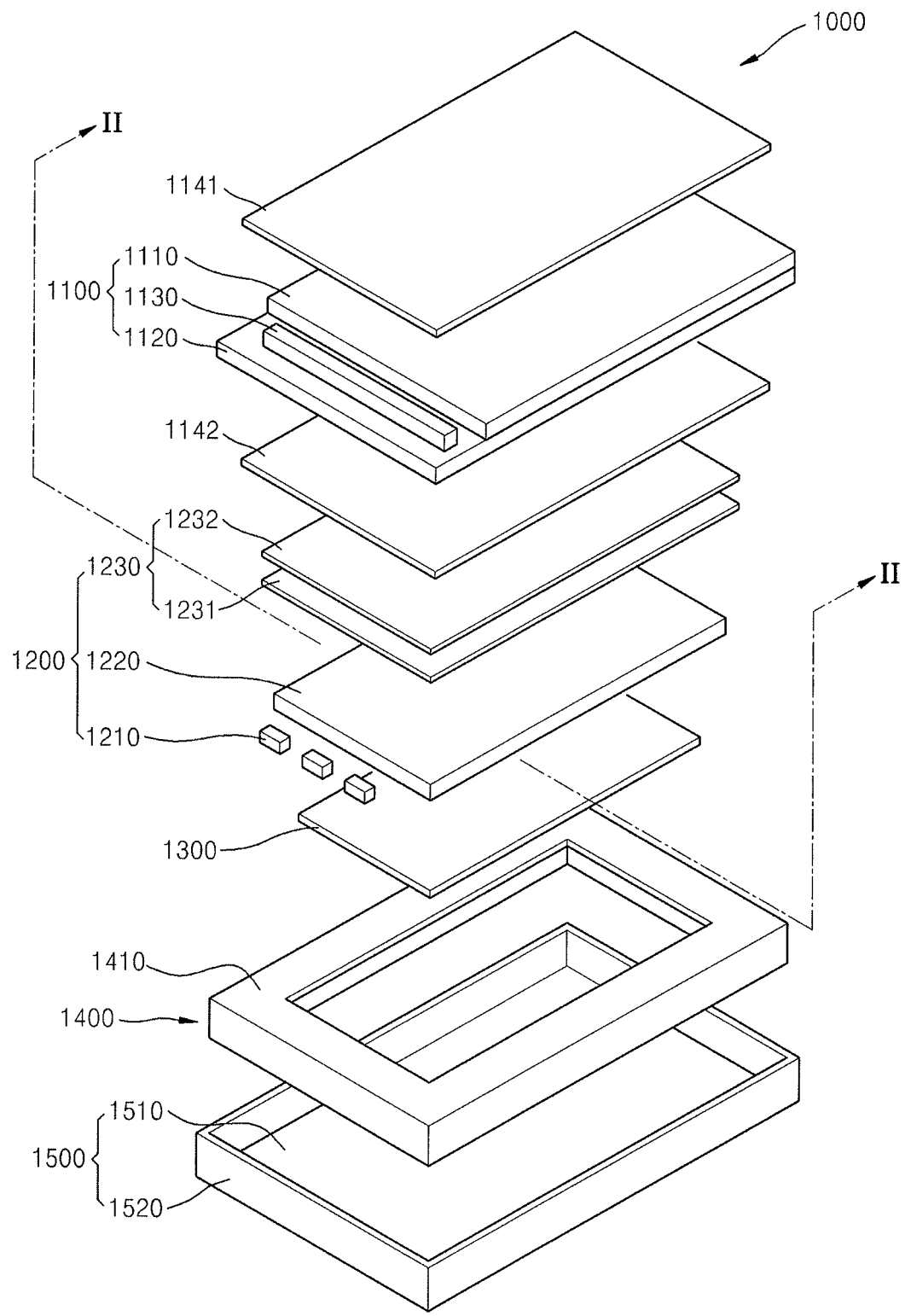
FIG. 1 is a schematic exploded perspective view of a liquid crystal display device according to an exemplary embodiment.
Figure 2:
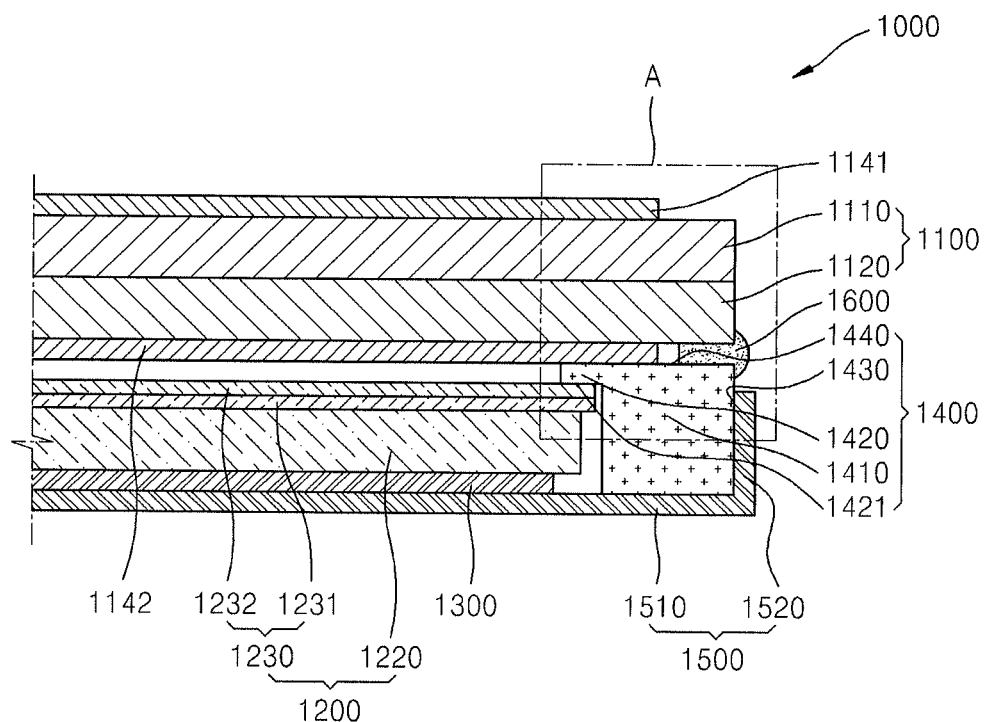
FIG. 2 is a cross-sectional view taken along line II-II of FIG. 1, according to an exemplary embodiment.
Figure 3:
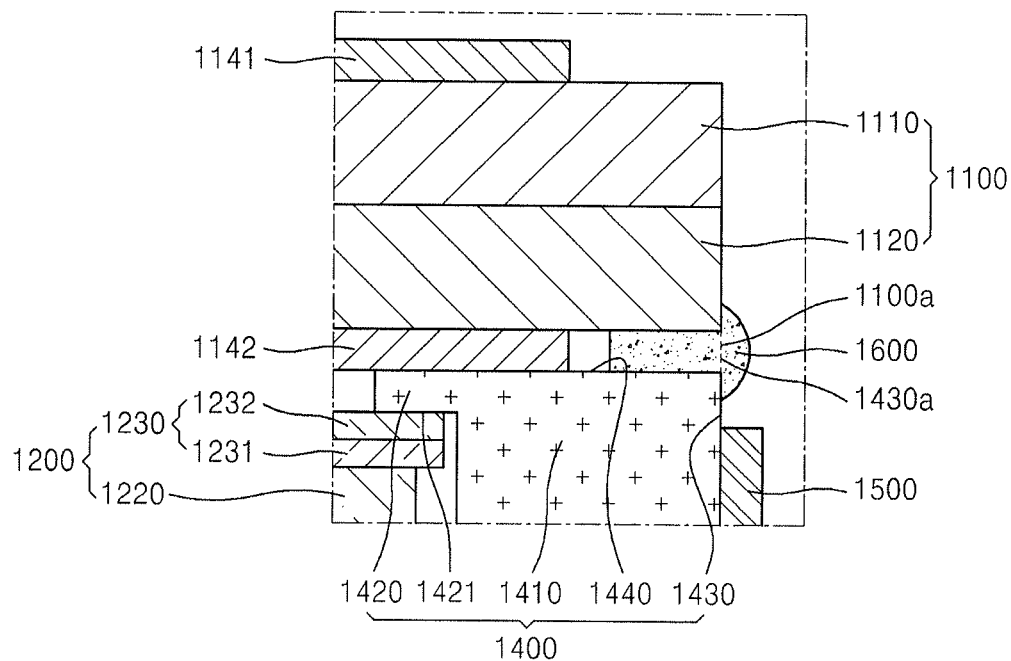
FIG. 3 is an enlarged view of region A of FIG. 2, according to an exemplary embodiment.

FIG. 1 is a schematic exploded perspective view of a liquid crystal display device 1000 according to an embodiment. FIG. 2 is a cross-sectional view taken along line II-II of FIG. 1, according to an embodiment. FIG. 3 is an enlarged view of region A of FIG. 2, according to an embodiment.

Referring to FIGS. 1 through 3, the liquid crystal display device 1000 may include a liquid crystal panel 1100, a backlight unit 1200, a mold frame 1400, a chassis 1500, a first polarizing member 1141, and a second polarizing member 1142.

The liquid crystal panel 1100 may largely include an upper substrate 1110 and a lower substrate 1120. The backlight unit 1200 may include light sources 1210, a light guide plate 1220, and an optical sheet unit 1230.

A detailed description of each element of the liquid crystal display device 1000 is provided herein.

The liquid crystal panel 1100 may include liquid crystal (not shown) between the lower substrate 1120 and the upper substrate 1110. That is, the liquid crystal (not shown) is encapsulated between the lower substrate 1120 and the upper substrate 1110. A circuit unit 1130 is disposed on the lower substrate 1120 so as to drive the liquid crystal panel 1100.

The lower and upper substrates 1120 and 1110 may be formed of transparent glass consisting of, e.g., $SiO_2$ as a main component. However, embodiments are not limited thereto, e.g., the lower and upper substrates 1120 and 1110 may be formed of transparent plastic.

In addition, although not illustrated in the drawings, a thin film transistor, a color filter, a black matrix, or the like may be disposed on the upper substrate 1110 or the lower substrate 1120.

For example, signal wires such as data lines and gate lines are formed on the lower substrate 1120, and thin film transistors are formed at intersections between the data lines and the gate lines. A pixel electrode may be formed in each of a plurality of pixel regions between the data lines and the gate lines, and a common electrode may be formed so as to correspond to each pixel electrode. In this regard, the common electrode may be formed on the upper substrate 1110 or the lower substrate 1120 according to a method of applying an electric field to the liquid crystal.

A pad region to which the data lines and the gate lines are connected is formed on one side of the lower substrate 1120, and the circuit unit 1130 that applies an electrical signal to the thin film transistor is mounted on the pad region. In FIG. 1, the circuit unit 1130 is formed only on one side of the lower substrate 1120, but is not limited thereto. For example, the circuit unit 1130 may be formed on at least two sides of the lower substrate 1120. Also, the circuit unit 1130 may be disposed on the upper substrate 1110 instead of the lower substrate 1120.

The circuit unit 1130 may apply various signals to the data lines or the gate lines. For example, the circuit unit 1130 may apply a scan signal and/or data signal for driving a gate to the data lines or the gate lines. In addition, the circuit unit 1130 supplies the data signal to the data lines or the scan signal to the gate lines, in response to a signal generated by a circuit substrate, such as a printed circuit board (PCB) (not shown). The circuit unit 1130 may be disposed on the lower substrate 1120 by using various methods, such as a chip-on-glass (COG) method.

The first polarizing member 1141 may be attached on a top surface of the liquid crystal panel 1100, i.e., a surface of the upper substrate 1110 that is opposite to a surface of the upper substrate 1110 facing the lower substrate 1120. The first polarizing member 1141 may be of a sheet type.

The second polarizing member 1142 may be attached on a bottom surface of the liquid crystal panel 1100, i.e., a surface of the lower substrate 1120 that is opposite to a surface of the lower surface 1120 facing the upper substrate 1110. The second polarizing member 1142 may be of a sheet type.

In such a structure, while light emitted from the backlight unit 1200, which will be described later in detail, is passing through the second polarizing member 1142, the liquid crystal (not shown), and the first polarizing member 1141, optical properties of the light are changed.

The backlight unit 1200 is disposed below the liquid crystal panel 1100. The backlight unit 1200 includes the light sources 1210, the light guide plate 1220, and the optical sheet unit 1230.

The light sources 1210, which are members for generating light, may be a light-emitting diode (LED), but are not limited thereto. For example, the light sources 1210 may be a cold cathode fluorescent lamp (CCFL) or may be formed using various light-generating materials. In FIG. 1, it is illustrated that three light sources 1210 are disposed on one side of the light guide plate 1220; however, embodiments are not limited to the above example. For example, the number of light sources 1210 may be variously determined, and, e.g., the light sources 1210 may be disposed on both sides of the light guide plate 1220.

The light guide plate 1220 may convert light that is incident on the light guide plate 1220 from the light source 1210 to a surface light and emit the converted light towards the liquid crystal panel 1100. Thus, the light guide plate 1220 enables light to be effectively transmitted to the liquid crystal panel 1100, thereby improving image quality characteristics of the liquid crystal display device 1000. The light guide plate 1220 may be formed of a material having a good light transmittance in order to effectively transmit the light generated by the light source 1210 into the liquid crystal panel 1100. In addition, the light guide plate 1220 may be formed of a material having a high strength so that the backlight unit 1200 may maintain its overall durability.

For example, the light guide plate 1220 may include polymethyl methacrylate (PMMA). Also, the light guide plate 1220 may include polycarbonate (PC).

The optical sheet unit 1230 may be disposed on the light guide plate 1220, i.e., between the light guide plate 1220 and the liquid crystal panel 1100. The optical sheet unit 1230 may include a first optical sheet 1231 and a second optical sheet 1232. However, embodiments are not limited thereto, e.g., the optical sheet unit 1230 may include at least three optical sheets or a single optical sheet.

The optical sheet unit 1230 may improve the luminance of light emitted from the light guide plate 1220. In particular, the optical sheet unit 1230 may include the first optical sheet 1231 that diffuses the light emitted from the light guide plate 1220 and the second optical sheet 1232 that functions as a prism for concentrating the light emitted from the light guide plate 1220. However, the structure of the optical sheet unit 1230 is not limited to the above example, and, as described above, the optical sheet unit 1230 may include a single optical sheet or at least three optical sheets. In some embodiments, the first optical sheet 1231 may have the light concentration function and the second optical sheet 1232 may have the light diffusion function.

A mold frame 1400 is disposed at an outer side of the backlight unit 1200. In particular, the mold frame 1400 may be disposed to correspond to side surfaces of the backlight unit 1200 so as to surround and/or enclose the backlight unit 1200. For example, as illustrated in FIG. 1, the mold frame 1400 may have a tetragonal frame shape with a hollow middle. The mold frame 1400 may be formed of a plastic material, and thus, may have an improved durability and be relatively lightweight.

The mold frame 1400 may largely include a main body part 1410 and a protrusion 1420. The main body part 1410 may be configured to surround the backlight unit 1200. The protrusion 1420 protrudes from the main body part 1410. In particular, the protrusion 1420 protrudes towards a hollow central portion of the mold frame 1400 away from the main body part 1410. The protrusion 1420 may be disposed between the liquid crystal panel 1100 and the backlight unit 1200 so as to define and/or divide the liquid crystal panel 1100 and the backlight unit 1200. For example, the backlight unit 1200 may be under the protrusion 1420 so as to be enclosed by the main body part 1410 of the mold frame 1400, and the liquid crystal panel 1100 may be seated on the protrusion 1420 and the main body part 1410.

For example, the mold frame 1400 has a smooth top surface 1440, which contacts a bottom surface of the second polarizing member 1142. A bottom surface 1421 of the protrusion 1420 contacts a top surface of the optical sheet unit 1230 of the backlight unit 1200, i.e., the top surface of the second optical sheet 1232. The protrusion 1420 of the mold frame 1400 may effectively support the backlight unit 1200.

The main body part 1410 of the mold frame 1400 surrounds the side surfaces of the backlight unit 1200 and the protrusion 1420 of the mold frame 1400 contacts the top surface of the backlight unit 1200, i.e., the second optical sheet 1232, so that the backlight unit 1200 is effectively supported by the mold frame 1400. Although not illustrated in the drawings, the main body part 1410 of the mold frame 1400 may be configured so as to contact side surfaces of the optical sheet unit 1230, whereby the supporting properties of the mold frame 1400 may be improved. Also, the main body part 1410 of the mold frame 1400 may be configured so as to contact the side surfaces of the optical sheet unit 1230 and side surfaces of the light guide plate 1220.

The mold frame 1400 has an outer side surface 1430, i.e., a side surface 1430 that is opposite to a side surface of the mold frame 1400 facing the backlight unit 1200. The outer side surface 1430 of the mold frame 1400 is not formed beyond the liquid crystal panel 1100. For example, a lateral side of the outer side surface 1430 is vertically aligned with a lateral side of the liquid crystal panel 1100. That is, as illustrated in FIG. 3, an extension line 1430a of the side surface 1430 of the mold frame 1400 is formed at least in parallel to an extension line 1100a of a side surface of the liquid crystal panel 1100. For example, the extension line 1430a of the side surface 1430 of the mold frame 1400 may be formed within the extension line 1100a of the side surface of the liquid crystal panel 1100.

By forming the side surface 1430 of the mold frame 1400 as described above, an unnecessary width of the liquid crystal display device 1000 is minimized, and thus, the liquid crystal display device 1000 may be manufactured with an improved slimness and an improved user convenience.

An adhesive member 1600 may be configured to bond the liquid crystal panel 1100 to the mold frame 1400. The adhesive member 1600 may be disposed between the liquid crystal panel 1100 and the mold frame 1400 with a space from the second polarizing member 1142. In addition, the adhesive member 1600 may be disposed on portions of side and bottom surfaces of the liquid crystal panel 1100 and portions of top and side surfaces of the mold frame 1400.

The adhesive member 1600 may contain a variety of materials, e.g., a thermoplastic resin that is melted by heating and cured rapidly during cooling. In particular, the adhesive member 1600 may be a hot melt adhesive.

The liquid crystal panel 1100 and the mold frame 1400 may be effectively bonded together by applying the adhesive member 1600 in a space between liquid crystal panel 1100 and the mold frame 1400 and with a space from the second polarizing member 1142 so as to contact predetermined regions of the side surfaces of the liquid crystal panel 1100 and the mold frame 1400.

A reflective sheet 1300 is disposed on a bottom surface of the backlight unit 1200, i.e., a bottom surface of the light guide plate 1220. The reflective sheet 1300 blocks light from leaking to the outside through the bottom surface of the light guide plate 1220 and reflects the light toward the light guide plate 1220. Therefore, an optical efficiency of the backlight unit 1200 may be improved. The reflective sheet 1300 may be formed of one of various materials having high reflexibility, e.g., polyethylene terephthalate (PET), which is of a white color, or polycarbonate (PC).

The chassis 1500 is configured so as to correspond to side and bottom surfaces of the mold frame 1400 and the backlight unit 1200. As illustrated in FIG. 1, the chassis 1500 may include a bottom part 1510 and a side surface part 1520. The bottom part 1510 corresponds to the bottom surface of the mold frame 1400 and the bottom surface of the reflective sheet 1300. The side surface part 1520 corresponds to the side surface 1430 of the mold frame 1400. In this regard, the side surface part 1520 does not completely cover the side surface 1430 of the mold frame 1400, e.g., so as to overlap only a lower portion of the side surface 1430 while an upper portion of side surface 1430 is exposed. That is, the side surface part 1520 covers a region of the side surface 1430 of the mold frame 1400. The chassis 1500 may be formed of a material having a high strength, e.g., a metal, in order to protect the mold frame 1400 and the backlight unit 1200.

In an exemplary embodiment, the mold frame 1400 includes the main body part 1410 and the protrusion 1420. The main body part 1410 is configured so as to surround side surfaces of the backlight unit 1200. The protrusion 1420 protrudes from the main body part 1410 and contacts a top surface of the backlight unit 1200, i.e., a top surface of the second optical sheet 1232, thereby supporting the backlight unit 1200. The mold frame 1400 effectively supports the backlight unit 1200, whereby the durability of the backlight unit 1200 is improved.

In addition, the side surface 1430 of the mold frame 1400 is not formed beyond the liquid crystal panel 1100 so that the liquid crystal display device 1000 has a relatively small width. Therefore, the liquid crystal display device 1000 that is relatively lightweight may be easily manufactured.

In particular, by disposing the adhesive member 1600 in the space between the mold frame 1400 and the liquid crystal panel 1100 and with a space from the second polarizing member 1142 so as to contact a predetermined region of each side surface of the mold frame 1400 and the liquid crystal panel 1100, the mold frame 1400 and the liquid crystal panel 1100 may be easily bonded together, whereby the durability of the liquid crystal display device 1000 may be easily improved.

Figure 4:
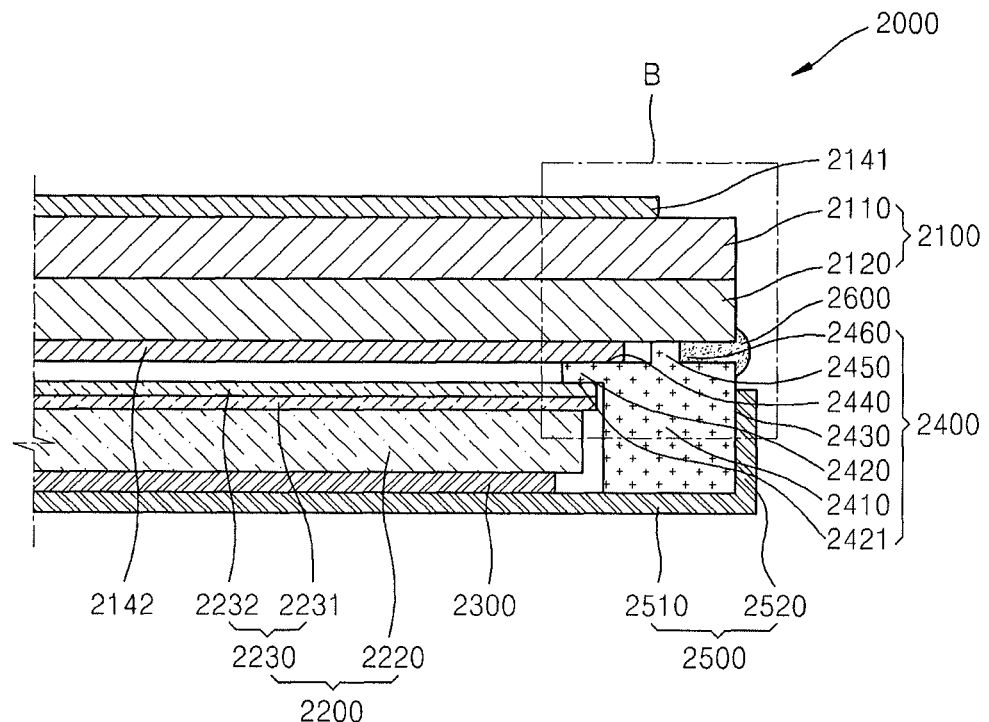
FIG. 4 is a schematic cross-sectional view of a liquid crystal display device, according to an exemplary embodiment.
Figure 5:
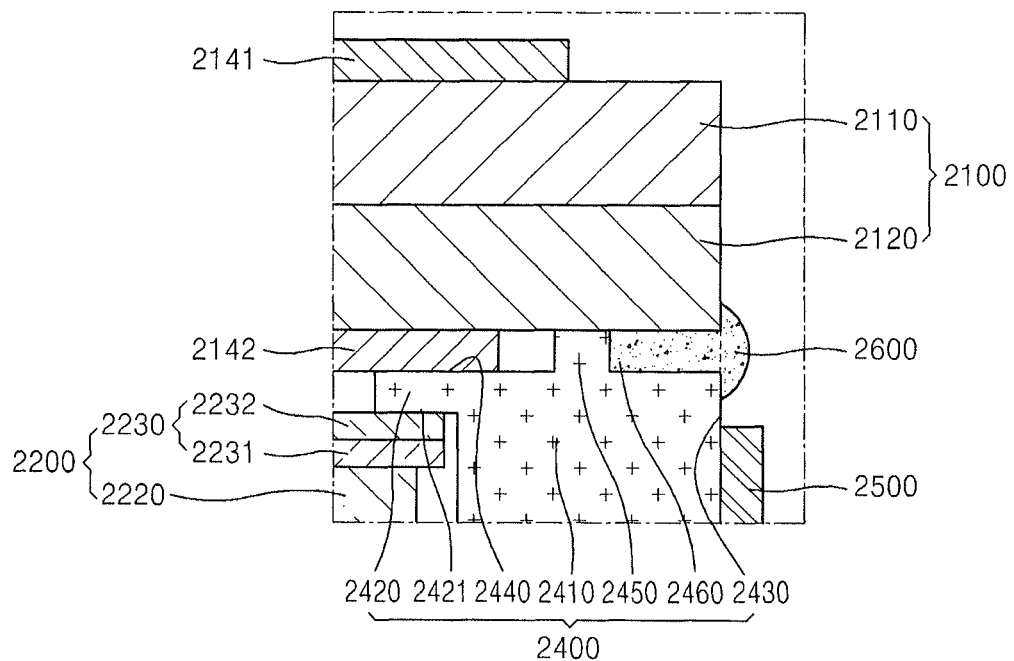
FIG. 5 is an enlarged view of region B of FIG. 4, according to an exemplary embodiment.

FIG. 4 is a schematic cross-sectional view of a liquid crystal display device 2000 according to another embodiment that is similar to the liquid crystal display device 1000, except for a configuration of the a mold frame 2400. FIG. 5 is an enlarged view of region B of FIG. 4, according to an embodiment.

Referring to FIGS. 4 and 5, the liquid crystal display device 2000 may include a liquid crystal panel 2100, a backlight unit 2200, the mold frame 2400, a chassis 2500, a first polarizing member 2141, and a second polarizing member 2142.

The liquid crystal panel 2100 may largely include an upper substrate 2110 and a lower substrate 2120. The backlight unit 2200 may include a light source (not shown), a light guide plate 2220, and an optical sheet unit 2230.

A detailed description of each element of the liquid crystal display device 2000 is provided herein.

The liquid crystal panel 2100 may include liquid crystal (not shown) between the lower substrate 2120 and the upper substrate 2110. That is, the liquid crystal (not shown) is encapsulated between the lower substrate 2120 and the upper substrate 2110.

Although not illustrated in FIGS. 4 and 5, a circuit unit (not shown) may be disposed on the lower substrate 2120 in order to drive the liquid crystal panel 2100. In addition, although not illustrated in the drawings, a thin film transistor, a color filter, a black matrix, or the like may be disposed on the upper substrate 2110 or the lower substrate 2120.

The first polarizing member 2141 may be attached on a top surface of the liquid crystal panel 2100, i.e., a surface of the upper substrate 2110 that is opposite to a surface of the upper substrate 2110 facing the lower substrate 2120. The first polarizing member 2141 may be of a sheet type.

The second polarizing member 2142 may be attached on a bottom surface of the liquid crystal panel 2100, i.e., a surface of the lower substrate 2120 that is opposite to a surface of the lower surface 2120 facing the upper substrate 2110. The second polarizing member 2142 may be of a sheet type.

In such a structure, while light emitted from the backlight unit 2200, which will be described later in detail, is passing through the second polarizing member 2142, the liquid crystal (not shown), and the first polarizing member 2141, optical properties of the light are changed.

The backlight unit 2200 is disposed below the liquid crystal panel 2100. The backlight unit 2200 includes the light source (not shown), the light guide plate 2220, and the optical sheet unit 2230.

The light source (not shown), which is a member for generating light, may be a light-emitting diode (LED) or may include various light-generating materials. The light source (not shown) may be disposed on at least one side of the light guide plate 2220.

The light guide plate 2220 may convert light that is incident on the light guide plate 2220 from the light source (not shown) to a surface light and emit the converted light towards the liquid crystal panel 2100. Thus, the light guide plate 2220 enables light to be effectively transmitted to the liquid crystal panel 2100, thereby improving image quality characteristics of the liquid crystal display device 2000. The light guide plate 2220 may be formed of a material having a good light transmittance in order to effectively transmit the light generated by the light source (not shown) into the liquid crystal panel 2100. In addition, the light guide plate 2220 may be formed of a material having a high strength so that the backlight unit 2200 may maintain overall its durability.

For example, the light guide plate 2220 may include polymethyl methacrylate (PMMA). Also, the light guide plate 2220 may include polycarbonate (PC).

The optical sheet unit 2230 may be disposed on the light guide plate 2220, i.e., between the light guide plate 2220 and the liquid crystal panel 2100. The optical sheet unit 2230 may include a first optical sheet 2231 and a second optical sheet 2232. However, embodiments are not limited thereto, e.g., the optical sheet unit 2230 may include at least three optical sheets or a single optical sheet.

The optical sheet unit 2230 may improve the luminance of light emitted from the light guide plate 2220. For example, the optical sheet unit 2230 may include the first optical sheet 2231 that diffuses the light emitted from the light guide plate 2220 and the second optical sheet 2232 that functions as a prism for concentrating the light emitted from the light guide plate 2220. However, the structure of the optical sheet unit 2230 is not limited to the above example, and, as described above, the optical sheet unit 2230 may include a single optical sheet or at least three optical sheets. In some embodiments, the first optical sheet 2231 may have the light concentration function and the second optical sheet 2232 may have the light diffusion function.

The mold frame 2400 may be disposed at an outer side of the backlight unit 2200. For example, the mold frame 2400 may be disposed to correspond to side surfaces of the backlight unit 2200 so as to surround the backlight unit 2200. In particular, the mold frame 2400 may have a tetragonal frame shape with a hollow middle. The mold frame 2400 may be formed of a plastic material, and thus, may have an improved durability and be relatively lightweight.

The mold frame 2400 largely includes a main body part 2410, a protrusion 2420, and a blocking part 2450.

The main body part 2410 may be configured to surround the backlight unit 2200. The protrusion 2420 protrudes from the main body part 2410, e.g., similar to the protrusion 1420 illustrated in FIG. 2. In such a configuration, the protrusion 2420 may be disposed between the liquid crystal panel 2100 and the backlight unit 2200 so as to define and/or divide the liquid crystal panel 2100 and the backlight unit 2200.

In particular, the mold frame 2400 has a smooth top surface 2440, which contacts a bottom surface of the second polarizing member 2142. In addition, a bottom surface 2421 of the protrusion 2420 contacts a top surface of the optical sheet unit 2230 of the backlight unit 2200, i.e., a top surface of the second optical sheet 2232. The protrusion 2420 of the mold frame 2400 may effectively support the backlight unit 2200.

The main body part 2410 of the mold frame 2400 surrounds the side surfaces of the backlight unit 2200, and the protrusion 2420 of the mold frame 2400 contacts the top surface of the backlight unit 2200, i.e., the second optical sheet 2232, so that the backlight unit 2200 is effectively supported and fixed by the mold frame 2400. Although not illustrated in FIGS. 4 and 5, the main body part 2410 of the mold frame 2400 may be configured so as to contact side surfaces of the optical sheet unit 2230, whereby the supporting properties of the mold frame 2400 may be improved. Also, the main body part 2410 of the mold frame 2400 may be configured so as to contact the side surfaces of the optical sheet unit 2230 and side surfaces of the light guide plate 2220.

The mold frame 2400 has an outer side surface 2430, i.e., a side surface 2430 that is opposite to a side surface of the mold frame 2400 facing the backlight unit 2200. The outer side surface 2430 of the mold frame 2400 is not formed beyond the liquid crystal panel 2100. That is, an extension line of the outer side surface 2430 of the mold frame 2400 is formed at least in parallel to an extension line of a side surface of the liquid crystal panel 2100.

By forming the outer side surface 2430 of the mold frame 2400, an unnecessary width of the liquid crystal display device 2000 is minimized, and thus, the liquid crystal display device 1000 may be manufactured with an improved slimness and an improved user convenience.

The blocking part 2450 of the mold frame 2400 protrudes from the top surface 2440 thereof. That is, the blocking part 2450 protrudes from the top surface 2440 of the mold frame 2400 towards the liquid crystal panel 2100. The blocking part 2450 may protrude so as to contact the liquid crystal panel 2100, e.g., to contact a bottom surface of the lower substrate 2120 of the liquid crystal panel 2100. The second polarizing member 2142 may be configured to be separate from the blocking part 2450. The blocking part 2450 is formed so as to be inside the outer side surface 2430 of the mold frame 2400. Accordingly, a predetermined space 2460 is formed in an area between the blocking part 2450 and the outer side surface 2430 and the liquid crystal panel 2100.

An adhesive member 2600 is disposed so as to bond the liquid crystal panel 2100 to the mold frame 2400. The adhesive member 2600 is disposed in the above-described predetermined space 2460, i.e., the space between the blocking part 2450 and the outer side surface 2430 and the liquid crystal panel 2100. In addition, the adhesive member 2600 is disposed on portions of side and bottom surfaces of the liquid crystal panel 2100 and portions of top and side surfaces of the mold frame 2400.

The adhesive member 2600 may contain a variety of materials, e.g., a thermoplastic resin that is melted by heating and cured rapidly during cooling. In particular, the adhesive member 2600 may be a hot melt adhesive.

By disposing the adhesive member 2600 in the predetermined space 2460 formed between the blocking part 2450 and the outer side surface 2430 and the liquid crystal panel 2100 so as to contact a predetermined region of each of the side surface of the liquid crystal panel 2100 and the outer side surface 2430 of the mold frame 2400, which is adjacent to the predetermined space 2400, the liquid crystal panel 2100 and the mold frame 2400 may be effectively bonded together.

A reflective sheet 2300 may be disposed on a bottom surface of the backlight unit 2200, i.e., a bottom surface of the light guide plate 2220. The reflective sheet 2300 blocks light from leaking to the outside through the bottom surface of the light guide plate 2220 and reflects the light toward the light guide plate 2220. Therefore, an optical efficiency of the backlight unit 2200 may be improved. The reflective sheet 2300 may be formed of one of various materials having high flexibility, e.g., polyethylene terephthalate (PET), which is of a white color, or polycarbonate (PC).

The chassis 2500 is configured so as to correspond to side and bottom surfaces of the mold frame 2400 and the backlight unit 2200. The chassis 2500 includes a bottom part 2510 and a side surface part 2520. The bottom part 2510 corresponds to the bottom surface of the mold frame 2400 and the bottom surface of the reflective sheet 2300. The side surface part 2520 corresponds to the outer side surface 2430 of the mold frame 2400. In this regard, the side surface part 2520 of the chassis 2500 does not completely cover the outer side surface 2430 of the mold frame 2400. That is, the side surface part 2520 of the chassis 2500 covers a region of the outer side surface 2430 of the mold frame 2400. The chassis 2500 may be formed of a material having a high strength, e.g., a metal, in order to protect the mold frame 2400 and the backlight unit 2200.

In the present embodiment, the mold frame 2400 includes the main body part 2410 and the protrusion 2420. The main body part 2410 is configured so as to surround side surfaces of the backlight unit 2200. The protrusion 2420 protrudes from the main body part 2410 and contacts a top surface of the backlight unit 2200, i.e., a top surface of the second optical sheet 2232, thereby supporting the backlight unit 2200. The mold frame 2400 may effectively support the backlight unit 2200, whereby the durability of the backlight unit 2200 is improved.

The outer side surface 2430 of the mold frame 2400 is not formed beyond the liquid crystal panel 2100 so that the liquid crystal display device 2000 has a relatively small width. Therefore, the liquid crystal display device 2000 is easily manufactured to be slim in thickness.

The mold frame 2400 includes the blocking part 2450 protruding from the top surface 2440 of the mold frame 2400, and the adhesive member 2600 is disposed in the predetermined space 2460 between the blocking part 2450, the outer side surface 2430, and the liquid crystal panel 2100. Thus, the mold frame 2400 and the liquid crystal panel 2100 may be easily bonded together, whereby the durability of the liquid crystal display device 2000 may be easily improved. Since the adhesive member 2600 is formed in the predetermined space 2460, the adhesive member 2600 may be effectively disposed without flowing to the outside, and thus, protruding of the adhesive member 2600 from the side surface of the liquid crystal panel 2100 may be minimized.

For example, the blocking part 2450 is formed so as to contact the bottom surface of the liquid crystal panel 2100, i.e., the bottom surface of the lower substrate 2120. Accordingly, the adhesive member 2600 is blocked by the blocking part 2450 so that the adhesive member 2600 is unable to permeate into the second polarizing member 2142. Therefore, the possibility of damage to the second polarizing member 2142 by the adhesive member 2600 may be reduced and/or prevented. In addition, the blocking part 2450 may reduce the possibility of and/or prevent the adhesive member 2600 from permeating into the backlight unit 2200.

An adhesive member that is formed by curing after heating an adhesive material to change it to a liquid state, may permeate into the backlight unit 2200, which may cause defects in the backlight unit 2200. However, according to exemplary embodiments, the blocking part 2450 may initially block and/or prevent the permeation of the adhesive member 2600 into the backlight unit 2200.

Figure 6:
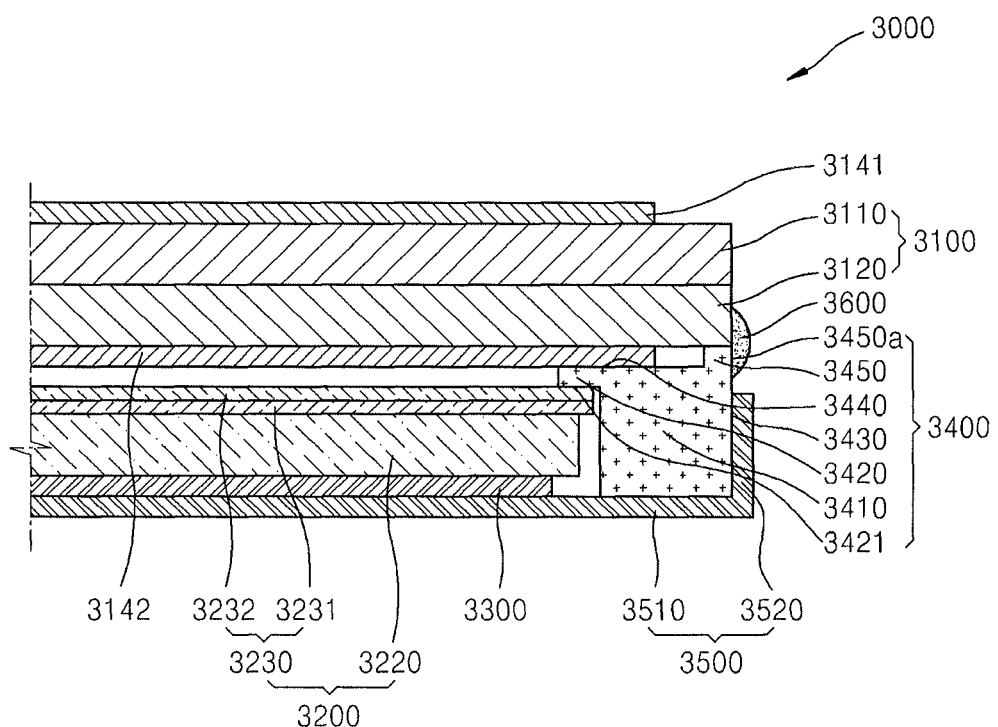
FIG. 6 is a schematic cross-sectional view of a liquid crystal display device according to an exemplary embodiment.

FIG. 6 is a schematic cross-sectional view of a liquid crystal display device 3000 according to another embodiment that is similar to the liquid crystal display device 1000, except for a configuration of the a mold frame 3400.

Referring to FIG. 6, the liquid crystal display device 3000 may include a liquid crystal panel 3100, a backlight unit 3200, the mold frame 3400, a chassis 3500, a first polarizing member 3141, and a second polarizing member 3142.

The liquid crystal panel 3100 may largely include an upper substrate 3110 and a lower substrate 3120. The backlight unit 3200 may include a light source (not shown), a light guide plate 3220, and an optical sheet unit 3230.

A detailed description of each element of the liquid crystal display device 3000 is provided herein.

The liquid crystal panel 3100 may include liquid crystal (not shown) between the lower substrate 3120 and the upper substrate 3110. That is, the liquid crystal (not shown) is encapsulated between the lower substrate 3120 and the upper substrate 3110.

Although not illustrated in FIG. 6, a circuit unit (not shown) may be disposed on the lower substrate 3120 in order to drive the liquid crystal panel 3100. In addition, although not illustrated in the drawing, a thin film transistor, a color filter, a black matrix, or the like may be disposed on the upper substrate 3110 or the lower substrate 3120.

The first polarizing member 3141 may be attached on a top surface of the liquid crystal panel 3100, i.e., a surface of the upper substrate 3110 that is opposite to a surface of the upper substrate 3110 facing the lower substrate 3120. The first polarizing member 3141 may be of a sheet type.

The second polarizing member 3142 may be attached on a bottom surface of the liquid crystal panel 3100, i.e., a surface of the lower substrate 3120 that is opposite to a surface of the lower surface 3120 facing the upper substrate 3110. The second polarizing member 3142 may be of a sheet type.

In such a structure, while light emitted from the backlight unit 3200, which will be described later in detail, is passed through the second polarizing member 3142, the liquid crystal (not shown), and the first polarizing member 3141, optical properties of the light may be changed.

The backlight unit 3200 is disposed below the liquid crystal panel 3100. The backlight unit 3200 includes the light source (not shown), the light guide plate 3220, and the optical sheet unit 3230.

The light source (not shown), which is a member for generating light, may be a light-emitting diode (LED) or may include various light-generating materials. The light source (not shown) may be disposed on at least one side of the light guide plate 3220.

The light guide plate 3220 may convert light that is incident on the light guide plate 3220 from the light source (not shown) to a surface light and emit the converted light towards the liquid crystal panel 3100. Thus, the light guide plate 3220 may enable light to be effectively transmitted to the liquid crystal panel 3100, thereby improving image quality characteristics of the liquid crystal display device 3000. The light guide plate 3220 may be formed of a material having a good light transmittance in order to effectively transmit the light generated by the light source (not shown) into the liquid crystal panel 3100. In addition, the light guide plate 3220 may be formed of a material having a high strength so that the backlight unit 3200 may maintain its overall durability.

For example, the light guide plate 3220 may include polymethyl methacrylate (PMMA). Also, the light guide plate 2220 may include polycarbonate (PC).

The optical sheet unit 3230 may be disposed on the light guide plate 3220, i.e., between the light guide plate 3220 and the liquid crystal panel 3100. The optical sheet unit 3230 may include a first optical sheet 3231 and a second optical sheet 3232. However, embodiments are not limited thereto, e.g., the optical sheet unit 3230 may include at least three optical sheets or a single optical sheet.

The optical sheet unit 3230 may improve the luminance of light emitted from the light guide plate 3220. In particular, the optical sheet unit 3230 may include the first optical sheet 3231 that diffuses the light emitted from the light guide plate 3220 and the second optical sheet 3232 that functions as a prism for concentrating the light emitted from the light guide plate 3220. However, the structure of the optical sheet unit 3230 is not limited to the above example, and, as described above, the optical sheet unit 3230 may include a single optical sheet or at least three optical sheets. In some embodiments, the first optical sheet 3231 may have the light concentration function and the second optical sheet 3232 may have the light diffusion function.

The mold frame 3400 is disposed at an outer side of the backlight unit 3200. In particular, the mold frame 3400 is disposed to correspond to side surfaces of the backlight unit 3200 so as to surround the backlight unit 3200. In particular, the mold frame 3400 may have a tetragonal frame shape with a hollow middle. The mold frame 3400 may be formed of a plastic material, and thus, may have an improved durability and be relatively lightweight.

The mold frame 3400 largely includes a main body part 3410, a protrusion 3420, and a blocking part 3450. The protrusion 3420 may be similar to the protrusion 1420 illustrated in FIG. 2.

The main body part 3410 is configured to surround the backlight unit 3200. The protrusion 3420 protrudes from the main body part 3410. In such a configuration, the protrusion 3420 may be disposed between the liquid crystal panel 3100 and the backlight unit 3200 so as to define the liquid crystal panel 3100 and the backlight unit 3200.

The mold frame 3400 has a smooth top surface 3440, and the top surface 3440 of the mold frame 3400 contacts a bottom surface of the second polarizing member 3142. In addition, a bottom surface 3421 of the protrusion 3420 contacts a top surface of the optical sheet unit 3230 of the backlight unit 3200, i.e., a top surface of the second optical sheet 3232. The protrusion 3420 of the mold frame 3400 may effectively support the backlight unit 3200.

The main body part 3410 of the mold frame 3400 surrounds the side surfaces of the backlight unit 3200, and the protrusion 3420 of the mold frame 3400 contacts the top surface of the backlight unit 3200, i.e., the second optical sheet 3232, so that the backlight unit 3200 is effectively supported and fixed by the mold frame 3400. Although not illustrated in FIG. 6, the main body part 3410 of the mold frame 3400 may be configured so as to contact side surfaces of the optical sheet unit 3230, whereby the supporting properties of the mold frame 3400 may be improved. Also, the main body part 3410 of the mold frame 3400 may be configured so as to contact the side surfaces of the optical sheet unit 3230 and side surfaces of the light guide plate 3220.

The mold frame 3400 has an outer side surface 3430, i.e., a side surface 3430 that is opposite to a side surface of the mold frame 3400 facing the backlight unit 3200. The outer side surface 3430 of the mold frame 3400 is not formed beyond the liquid crystal panel 3100. That is, an extension line of the outer side surface 3430 of the mold frame 3400 is formed at least in parallel to an extension line of a side surface of the liquid crystal panel 3100.

The blocking part 3450 of the mold frame 3400 protrudes from the top surface 3440 thereof. That is, the blocking part 3450 protrudes from the top surface 3440 of the mold frame 3400 towards the liquid crystal panel 3100. The blocking part 3450 protrudes so as to contact the liquid crystal panel 3100, in particular, a bottom surface of the lower substrate 3120 of the liquid crystal panel 3100. The second polarizing member 3142 may be configured to be spaced apart from the blocking part 3450. The blocking part 3450 is formed in parallel to the outer side surface 3430 of the mold frame 3400. That is, a side surface 3450*a* of the blocking part 3450 coincides with a side surface of the mold frame 3400.

An adhesive member 3600 is disposed so as to bond the liquid crystal panel 3100 to the mold frame 3400. The adhesive member 3600 is disposed on a portion of a side surface of the liquid crystal panel 3100 and a portion of the outer side surface 3430 of the mold frame 3400. In particular, the adhesive member 3600 is disposed on the portion of the outer side surface 3430 of the mold frame 3400 which includes the side surface 3450*a* of the blocking part 3450 and on the portion of the side surface of the liquid crystal panel 3100 which is adjacent thereto.

The adhesive member 3600 may contain a variety of materials, e.g., a thermoplastic resin that is melted by heating and cured rapidly during cooling. In particular, the adhesive member 3600 may be a hot melt adhesive. In one embodiment, the adhesive member 3600 is formed by coating of a liquid material and curing the resulting material.

The liquid crystal panel 3100 and the mold frame 3400 may be efficiently bonded together by applying the adhesive member 3600 on the portion of the outer side surface 3430 of the mold frame 3400 which includes the side surface 3450*a* of the blocking part 3450 and on the portion of the side surface of the liquid crystal panel 3100 which is adjacent thereto.

A reflective sheet 3300 may be disposed on a bottom surface of the backlight unit 3200, i.e., a bottom surface of the light guide plate 3220. The reflective sheet 3300 blocks light from leaking to the outside through the bottom surface of the light guide plate 3220 and reflects the light toward the light guide plate 3220. Thus, an optical efficiency of the backlight unit 3200 may be improved. The reflective sheet 3300 may be formed of one of various materials having high reflexibility, e.g., polyethylene terephthalate (PET), which is of a white color, or polycarbonate (PC).

The chassis 3500 is configured so as to correspond to side surfaces and bottom surfaces of the mold frame 3400 and the backlight unit 3200. The chassis 3500 includes a bottom part 3510 and a side surface part 3520. The bottom part 3510 corresponds to the bottom surface of the mold frame 3400 and the bottom surface of the reflective sheet 3300. The side surface part 3520 corresponds to the outer side surface 3430 of the mold frame 3400. In this regard, the side surface part 3520 does not completely cover the outer side surface 3430 of the mold frame 3400. That is, the side surface part 3520 covers a region of the outer side surface 3430 of the mold frame 3400. The chassis 3500 may be formed of a material having a high strength, e.g., a metal, in order to protect the mold frame 3400 and the backlight unit 3200.

In the present embodiment, the mold frame 3400 includes the main body part 3410 and the protrusion 3420. The main body part 3410 is configured so as to surround side surfaces of the backlight unit 3200. The protrusion 3420 protrudes from the main body part 3410 and contacts a top surface of the backlight unit 3200, i.e., a top surface of the second optical sheet 3232, thereby supporting the backlight unit 3200. Consequently, the mold frame 3400 effectively supports the backlight unit 3200, whereby the durability of the backlight unit 3200 is improved.

In addition, the outer side surface 3430 of the mold frame 3400 is not formed beyond the liquid crystal panel 3100 so that the liquid crystal display device 3000 has a relatively small width. Therefore, the liquid crystal display device 3000 may be easily manufactured to be slim in thickness.

In addition, the mold frame 3400 includes the blocking part 3450 protruding from the top surface 3440 thereof, and the adhesive member 3600 is disposed on the portion of the outer side surface 3430 of the mold frame 3400 which includes the side surface 3450a of the blocking part 3450 and on the portion of the side surface of the liquid crystal panel 3100 which is adjacent thereto. Thus, the mold frame 3400 and the liquid crystal panel 3100 may be easily bonded together, whereby the durability of the liquid crystal display device 3000 may be easily improved.

In particular, the blocking part 3450 is formed so as to contact the bottom surface of the liquid crystal panel 3100, i.e., the bottom surface of the lower substrate 3120, and thus, the adhesive member 3600 is blocked by the blocking part 3450 so that the adhesive member 3600 is unable to permeate into the second polarizing member 3142. Therefore, the possibility of damage to the second polarizing member 3142 by the adhesive member 3600 may be reduced and/or prevented. In addition, the blocking part 3450 may reduce the possibility of and/or prevent the adhesive member 3600 from permeating into the backlight unit 3200.

An adhesive member that is formed by curing after heating an adhesive material to change it into a liquid state, may permeate into the backlight unit 2200, which may cause defects in the backlight unit 3200. However, according to an exemplary embodiment, the blocking part 3450 may initially reduce the possibility of and/or prevent the permeation of the adhesive member 3600 into the backlight unit 3200.

By way of summation and review, a liquid crystal display device includes a liquid crystal panel, a backlight unit, and the like. The liquid crystal panel may include two substrates and liquid crystals disposed between the two substrates. The backlight unit may include a light source for irradiating light to the liquid crystal molecules. In a liquid crystal display device, when a predetermined voltage is applied between the two substrates, the orientation of liquid crystal molecules included in the liquid crystal display device may be changed so that optical properties of light is changed according to the changed orientation of the liquid crystal molecules. Further, the light that passes through the liquid crystal molecules is also passed through a color filter to form an image of various colors.

Other members, such as a polarizing film, an optical film, and the like, may further be used to complete the manufacturing of the liquid crystal display device. However, a bonding process of these members is not easy, and thus, there is a limitation in improving durability of the liquid crystal display device.

As described above, one or more embodiments relate to a liquid crystal display device and a method of manufacturing the same, and more particularly, to a liquid crystal display device with improved durability and a method of manufacturing the same. For example, according to the one or more embodiments, the durability of a liquid crystal display device may be easily improved using a method of manufacturing the liquid crystal display device.

In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated.

Embodiments have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display device, comprising:
   a liquid crystal panel;
   a backlight unit that faces the liquid crystal panel and that includes a light source, a light guide plate, and an optical sheet unit;
   a mold frame including:
      a hollow central portion such that the mold frame surrounds side surfaces but not a bottom surface of the backlight unit,
      a main body part, and
      a protrusion, the protrusion being between the liquid crystal panel and the backlight unit and protruding from the main body part in a lateral direction;
   an adhesive member that bonds the mold frame to the liquid crystal panel, the adhesive member contacting side surfaces of the liquid crystal panel and the mold frame, which are adjacent to the space formed between the liquid crystal panel and the mold frame; and
   a separate chassis corresponding to a bottom surface of the backlight unit, and corresponding to a bottom surface and side surfaces of the mold frame, the chassis completely covering the lower portion of the side surfaces of the mold frame and not covering the adhesive member.

2. The liquid crystal display device of claim 1, wherein the adhesive member includes a thermoplastic resin.

3. The liquid crystal display device of claim 1, wherein the adhesive member includes a hot melt.

4. The liquid crystal display device of claim 1, wherein:
the side surfaces of the mold frame are opposite to surfaces of the mold frame facing the backlight unit, and
an extension line of the side surfaces of the mold frame are not formed beyond side surfaces of the liquid crystal panel.

5. The liquid crystal display device of claim 1, wherein a bottom surface of the protrusion contacts the optical sheet unit of the backlight unit.

6. The liquid crystal display device of claim 1, further comprising a polarizing member between the liquid crystal panel and the backlight unit, a top surface of the mold frame contacting a bottom surface of the polarizing member.

7. The liquid crystal display device of claim 6, wherein the top surface of the mold frame is smooth.

8. The liquid crystal display device of claim 1, further comprising a polarizing member between the liquid crystal panel and the backlight unit, wherein the adhesive member is configured to correspond to a space defined by the liquid crystal panel, the mold frame, and the polarizing member.

9. The liquid crystal display device of claim 1, further comprising a reflective sheet facing a surface of the light guide plate of the backlight unit that is opposite to a surface of the light guide plate that faces the liquid crystal panel.

10. The liquid crystal display device of claim 1, wherein the chassis includes a bottom part that corresponds to the bottom surfaces of the mold frame and the backlight unit, and includes a side surface part that extends from the bottom part and contacts the side surfaces of the mold frame.

11. A liquid crystal display device, comprising:
a liquid crystal panel;
a backlight unit that faces the liquid crystal panel and that includes a light source, a light guide plate, and an optical sheet unit;
a mold frame that encloses the backlight unit and that includes a main body part and a protrusion, the protrusion being between the liquid crystal panel and the backlight unit and protruding from the main body part in a lateral direction; and
an adhesive member that bonds the mold frame to the liquid crystal panel;
wherein the mold frame includes a blocking part that protrudes from a top surface of the mold frame, which faces the liquid crystal panel, toward the liquid crystal panel, and the adhesive member contacts a surface of the blocking part orthogonal to the top surface of the mold frame.

12. The liquid crystal display device of claim 11, wherein the blocking part contacts the liquid crystal panel.

13. The liquid crystal display device of claim 11, wherein the blocking part is spaced apart from a side surface of the mold frame such that the blocking part is inside from the side surface of the mold frame.

14. The liquid crystal display device of claim 13, further comprising a space between the blocking part, the side surface of the mold frame, and a side surface of the liquid crystal panel, the adhesive member being within the space and contacting a surface of the liquid crystal panel that faces the mold frame.

15. The liquid crystal display device of claim 11, wherein a side surface of the blocking part coincides with a side surface of the mold frame.

16. A method of manufacturing a liquid crystal display device, the method comprising:
preparing a liquid crystal panel;
disposing a backlight unit so as to face the liquid crystal panel, the backlight unit including a light source, a light guide plate, and an optical sheet unit;
disposing a mold frame that includes a main body part surrounding the backlight unit, a hollow central portion such that the mold frame surrounds side surfaces but not a bottom surface of the backlight unit, a protrusion that is disposed between the liquid crystal panel and the backlight unit, the protrusion protruding from the main body part, such that the mold frame contacts only a surface of the optical sheet unit facing the liquid crystal panel and optionally side surfaces of the optical sheet unit, and a blocking part that protrudes from a top surface of the mold frame, which faces the liquid crystal panel, toward the liquid crystal panel; and
bonding the mold frame to the liquid crystal panel with an adhesive member, the adhesive member contacting a surface of the blocking part orthogonal to the top surface of the mold frame.

17. The method of claim 16, wherein bonding the mold frame to the liquid crystal panel includes melting and cooling the adhesive member, the adhesive member including a thermoplastic resin.

18. The method of claim 16, wherein the adhesive member includes a hot melt.

19. The method of claim 16, wherein the adhesive member contacts a surface of the liquid crystal panel that faces the mold frame.

* * * * *